United States Patent
Ishikawa et al.

(10) Patent No.: US 10,486,986 B2
(45) Date of Patent: Nov. 26, 2019

(54) ELECTROLYZED WATER-GENERATING APPARATUS AND ELECTROLYZED WATER

(71) Applicants: NIHON TRIM CO., LTD., Osaka (JP); NATIONAL UNIVERSITY CORPORATION KOCHI UNIVERSITY, Kochi (JP)

(72) Inventors: Katsumi Ishikawa, Kochi (JP); Daiji Amenomori, Kochi (JP); Yoshinobu Koizumi, Kochi (JP); Yasuomi Hamauzu, Kochi (JP)

(73) Assignees: NIHON TRIM CO., LTD., Osaka (JP); NATIONAL UNIVERSITY CORPORATION KOCHI UNIVERSITY, Kochi (JP)

( * ) Notice: Subject to any disclaimer, the term of this patent is extended or adjusted under 35 U.S.C. 154(b) by 0 days.

(21) Appl. No.: 15/553,147

(22) PCT Filed: Feb. 8, 2016

(86) PCT No.: PCT/JP2016/000646
§ 371 (c)(1),
(2) Date: Aug. 23, 2017

(87) PCT Pub. No.: WO2016/136161
PCT Pub. Date: Sep. 1, 2016

(65) Prior Publication Data
US 2018/0111844 A1    Apr. 26, 2018

(30) Foreign Application Priority Data
Feb. 24, 2015   (JP) .................. 2015-034183

(51) Int. Cl.
C02F 1/461    (2006.01)
C02F 1/00     (2006.01)
C02F 103/02   (2006.01)

(52) U.S. Cl.
CPC .............. *C02F 1/008* (2013.01); *C02F 1/461* (2013.01); *C02F 1/4618* (2013.01);
(Continued)

(58) Field of Classification Search
CPC ...................................................... C02F 1/4618
See application file for complete search history.

(56) References Cited

U.S. PATENT DOCUMENTS 5,445,722 A    8/1995  Yamaguti et al.
2005/0121334 A1*  6/2005  Sumita ................... A61L 2/035
                                                              205/628

FOREIGN PATENT DOCUMENTS

CN    203346132 U   12/2013
JP    H06-3487 U    1/1994
(Continued)

OTHER PUBLICATIONS

Machine translation of WO2012060078 as JP5311242. (Year: 2012).*
(Continued)

*Primary Examiner* — Brian W Cohen
(74) *Attorney, Agent, or Firm* — Maschoff Brennan

(57) ABSTRACT

The electrolyzed water-generating apparatus 1 includes: a first electrode chamber Da; a first water inlet path 4a connected to the first electrode chamber Da to supply the first electrode chamber Da with raw water from outside; a first water outlet path 7a connected to the first electrode chamber Da, and dispensing out of the first electrode chamber Da electrolyzed hydrogen water generated by electrolysis in the first electrode chamber Da; and a charge amount adjuster 10 connected to the electrolysis tank D to adjust an amount of electrical charge to be provided to the electrolyzed hydrogen water. The charge amount adjuster 10 adjusts, based on a flow rate of the raw water, the amount of the electrical charge per unit quantity of the generated (Continued)

electrolyzed hydrogen water through control of an electrolytic current or an electrolytic voltage, so that the adjusted amount of the electrical charge is constant.

2 Claims, 2 Drawing Sheets

(52) U.S. Cl.
CPC .. *C02F 1/46104* (2013.01); *C02F 2001/4619* (2013.01); *C02F 2103/02* (2013.01); *C02F 2201/4611* (2013.01); *C02F 2201/4614* (2013.01); *C02F 2201/46145* (2013.01)

(56) References Cited

FOREIGN PATENT DOCUMENTS

| | | |
|---|---|---|
| JP | H06-79279 A | 3/1994 |
| JP | H06-226257 A | 8/1994 |
| JP | 3234025 B2 | 9/1994 |
| JP | H09-29254 A | 2/1997 |
| JP | 2003-159592 A | 6/2003 |
| JP | 2003-340451 A | 12/2003 |
| JP | 2005-279519 A | 10/2005 |
| JP | 4369579 B2 | 11/2009 |
| JP | 5311246 B2 | 5/2014 |
| WO | 2012/060078 A1 | 5/2012 |
| WO | WO-2012060078 A1 * | 5/2012 ............. C02F 1/467 |

OTHER PUBLICATIONS

EP Search Report dated Aug. 23, 2018 in application No. 16 754 917.9.

European Search Report dated Nov. 24, 2017, in application No. 16754917.9.

* cited by examiner

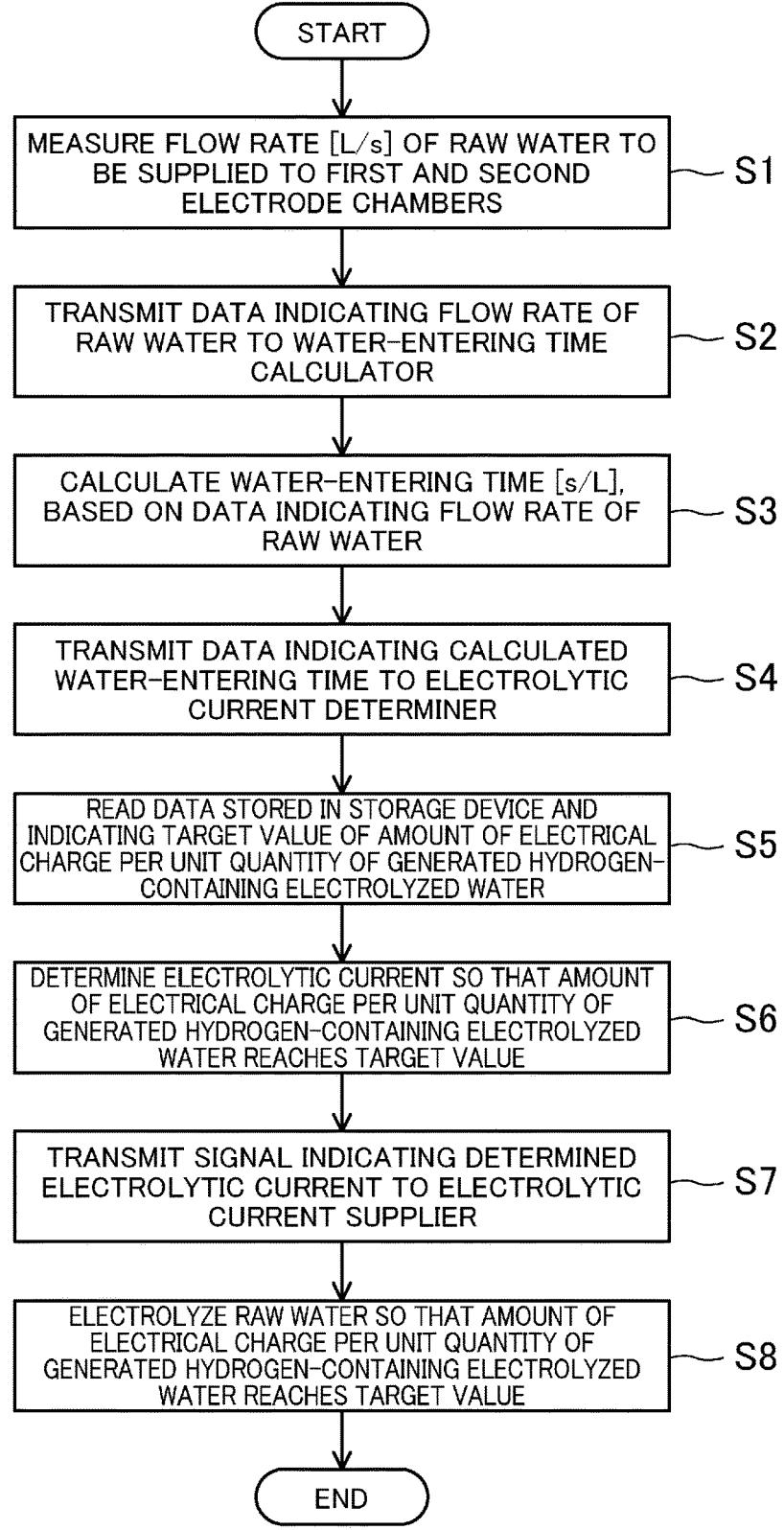

ELECTROLYZED WATER-GENERATING APPARATUS AND ELECTROLYZED WATER

TECHNICAL FIELD

The present invention relates to an electrolyzed water-generating apparatus which electrolyzes water to generate electrolyzed water. The present invention also relates to the electrolyzed water.

BACKGROUND ART

A conventional electrolyzed water-generating apparatus is used to electrolyze raw water to generate electrolyzed alkaline water and electrolyzed acidic water. This electrolyzed water-generating apparatus includes an electrolysis tank having a pair of electrodes (an anode and a cathode), and a separating membrane. The electrolyzed water-generating apparatus continuously runs raw water into the electrolysis tank and applies a voltage between the pair of the electrodes to directly apply a direct current to the raw water, and generate electrolyzed alkaline water including hydrogen gas and electrolyzed acidic water including oxygen gas.

Here, a user can check a pH value of the generated electrolyzed water digitally represented on a pH indicator. However, this technique has a problem in that when the user moves away from the pH indicator, it would be difficult for him or her to see the value. Moreover, the digital value makes it hard for the user to sensorially determine a pH level. (For example, how alkalic the alkaline water is.)

Hence, a disclosed electrolyzed water-generating apparatus includes: a pH indicator detecting and indicating a pH of water running through an electrolysis tank and ejected; and a color display panel displaying the pH by color. The color display panel displays a pH of the ejected water. This configuration allows a user to determine a pH level by color even though the user is away from the electrolyzed water-generating apparatus. Thanks to this feature, the user does not make a reading error as he or she might in reading a number, and may reliably and safely determine a pH level of alkaline water and acidic water. (See, for example, PATENT DOCUMENT 1.)

CITATION LIST

Patent Document

PATENT DOCUMENT 1: Japanese Patent No. 4369579.

SUMMARY OF THE INVENTION

Technical Problem

However, in the electrolyzed water-generating apparatus cited in PATENT DOCUMENT 1, an electrolytic current in electrolysis is constant, such that an amount of electrical charge to be provided to raw water inevitably changes based on a flow rate of the raw water. This causes a problem in that it is difficult to generate desired electrolyzed water (for example, agricultural electrolyzed water generated from raw water provided with a predetermined amount of electrical charge).

The present invention is conceived in view of the above problems, and attempts to provide an electrolyzed water-generating apparatus which may easily generate electrolyzed water having a predetermined amount of electrical charge in association with a flow rate of incoming raw water. The present invention also attempts to provide the electrolyzed water.

Solution to the Problem

In order to carry out the above attempts, an electrolyzed water-generating apparatus of the present invention includes: an electrolysis tank containing a first electrode chamber having a cathode, a second electrode chamber having an anode, and a separating membrane separating the first electrode chamber and the second electrode chamber from each other; a first water inlet path connected to the first electrode chamber to supply the first electrode chamber with raw water from outside; a second water inlet path connected to the second electrode chamber to supply the second electrode chamber with the raw water from outside; a first water outlet path connected to the first electrode chamber, and dispensing, out of the first electrode chamber, electrolyzed hydrogen water generated by electrolysis in the first electrode chamber; a second water outlet path connected to the second electrode chamber, and dispensing, out of the second electrode chamber, electrolyzed acidic water generated by the electrolysis in the second electrode chamber; and a charge amount adjuster connected to the electrolysis tank to adjust, in the electrolysis, an amount of electrical charge to be provided to the electrolyzed hydrogen water. The charge amount adjuster adjusts, based on a flow rate of the raw water, the amount of the electrical charge per unit quantity of the generated electrolyzed hydrogen water through control of an electrolytic current or an electrolytic voltage, so that the adjusted amount of the electrical charge is constant.

Such features make it possible to control the electrolytic current or the electrolytic voltage in association with the flow rate of the raw water in the electrolysis, facilitating generation of electrolyzed hydrogen water having desired; namely constant, electrical charge per unit quantity of the generated water.

Advantages of the Invention

The present invention facilitates generation of electrolyzed water having a desired amount of electrical charge.

BRIEF DESCRIPTION OF THE DRAWINGS

FIG. 2 is a flowchart depicting how an electrical charge amount adjuster according to the embodiment of the present invention adjusts an amount of electrical charge.

DESCRIPTION OF EMBODIMENT

Figure 1:
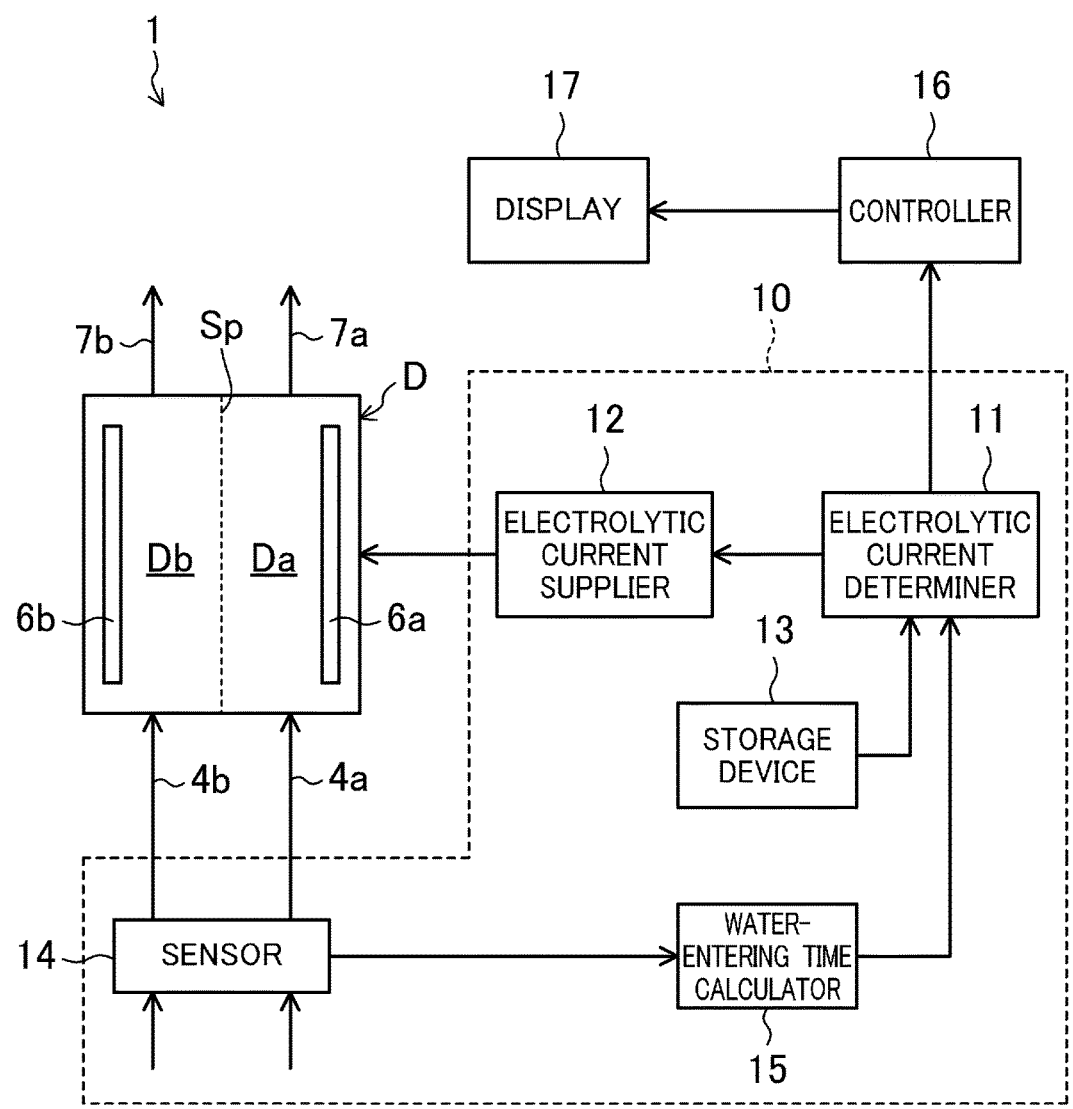
FIG. 1 illustrates an electrolyzed water-generating apparatus according to an embodiment of the present invention.

Described below in detail is an embodiment of the present invention, with reference to the drawings. FIG. 1 illustrates an electrolyzed water-generating apparatus according to an embodiment of the present invention.

An electrolyzed water-generating apparatus 1 electrolyzes raw water purified by a water purifier to generate, for example, water containing dissolved hydrogen for agricultural use (agricultural electrolyzed water).

The electrolyzed water-generating apparatus 1 includes an electrolysis tank D. This electrolysis tank D contains: a separating membrane Sp shaped into a thin sheet; a first electrode chamber (a cathode chamber) Da; and a second electrode chamber (an anode chamber) Db. Here, the first electrode chamber Da and the second electrode chamber Db are separated from each other by the separating membrane Sp.

This separating membrane Sp, referred to as "separator", is a thin sheet formed of a material permeable to ions generated when water is electrolyzed.

Moreover, as illustrated in FIG. 1, the first electrode chamber Da is provided with a cathode 6a acting as a first electrode, and the second electrode chamber Db is provided with an anode 6b acting as a second electrode. The cathode 6a and the anode electrode 6b face each other across the separating membrane Sp.

The cathode 6a and the anode 6b may contain any given material. An example of such a material is titan coated with platinum or iridium. In view of the electrolytic endurance of the electrodes, it is beneficial to use titan coated with platinum iridium.

As illustrated in FIG. 1, the electrolyzed water-generating apparatus 1 further includes: a first water inlet path 4a connected to the first electrode chamber Da; and a second water inlet path 4b connected to the second electrode chamber Db. Here, the first water inlet path 4a and the second water inlet path 4b respectively supply the first electrode chamber Da and the second electrode chamber Db with raw water (raw water purified by the water purifier) from outside.

Moreover, as illustrated in FIG. 1, the electrolyzed water-generating apparatus 1 includes: a first water outlet path 7a connected to the first electrode chamber Da; and a second water outlet path 7b connected to the second electrode chamber Db. Here, the first water outlet path 7a dispenses out of the first electrode chamber Da electrolyzed hydrogen water (regenerated water) generated by electrolysis in the first electrode chamber Da, and the second water outlet path 7b dispenses out of the second electrode chamber Db electrolyzed acidic water generated by electrolysis in the second electrode chamber Db.

In this embodiment, the electrolyzed hydrogen water generated in the first electrode chamber Da is dispensed through the first water outlet path 7a, and used as electrolyzed water. Note that the electrolyzed acidic water generated by electrolysis at the anode 6b is ejected outside through the second water outlet path 7b.

Here, a feature of the embodiment is that, when the electrolysis is performed using the electrolyzed water-generating apparatus 1, an electrolytic current is controlled to adjust, based on a flow rate of the raw water, an amount of electrical charge [C/L] per unit quantity of the generated electrolyzed hydrogen water so that the adjusted amount of electrical charge becomes constant. This is how the electrolyzed water (electrolyzed hydrogen water) is generated.

Here, the "amount of electrical charge per unit quantity of the generated hydrogen-containing electrolyzed water" is an amount of electrical charge provided to one liter of water traveling, during the electrolysis, through the first electrode chamber Da. Note that the amount of the electrical charge may be calculated according to the following Equation (1):

[Math. 1]

$$C = I \times S \tag{1}$$

In Equation (1), "C" is an amount of electrical charge, "I" is an electrolytic current, and "S" is a time period (hereinafter referred to as "water-entering time") required for one liter of water (raw water) to travel through the inside of the electrolyzed water generating apparatus 1 including the electrolysis tank D, and enter the first electrode chamber Da. Specifically, "S" indicates how much time to be spent from when the supply of the water (raw water) to the first electrode chamber Da starts until when one liter of the water (raw water) enters the first electrode chamber Da.

To be more specific, as illustrated in FIG. 1, the electrolyzed water-generating apparatus 1 of this embodiment includes an electrical charge amount adjuster 10 for adjusting, in electrolysis, an amount of electrical charge to be provided to the electrolyzed hydrogen water, so that the adjusted amount of electrical charge is constant.

Moreover, the charge amount adjuster 10 includes: an electrolytic current determiner 11 determining an electrolytic current in the electrolysis performed by the electrolyzed water-generating apparatus 1; an electrolytic current supplier 12 connected to the electrolytic current determiner 11 and the electrolysis tank D, and supplying the electrolysis tank D with the electrolytic current; and a storage device 13 connected to the electrolytic current determiner 11, and storing data indicating a target value of the amount of the electrical charge per unit quantity of the generated hydrogen-containing electrolyzed water.

Furthermore, the electrical charge amount adjuster 10 includes: a sensor 14 provided to the first water inlet path 4a and the second water inlet path 4b, and measuring a flow rate [L/S] of the raw water to be supplied to the first electrode chamber Da and the second electrode chamber Db; and a water-entering time calculator 15 connected to the electrolytic current determiner 11 and the sensor 14, and calculating the water-entering time.

Described next is how the charge amount adjuster 10 adjusts the amount of the electrical charge.

FIG. 2 is a flowchart depicting how the charge amount adjuster 10 according to the embodiment of the present invention adjusts the amount of the electrical charge.

First, the sensor 14 measures the flow rate [L/s] of the raw water to be supplied to the first electrode chamber Da and the second electrode chamber Db (Step S1).

Next, data indicating the flow rate, of the raw water, measured by the sensor 14 is transmitted to the water-entering time calculator 15 (Step S2).

Then, the water-entering time calculator 15 calculates a water-entering time [s/L], based on the transmitted data indicating the flow rate of the raw water (Step S3). For example, the water-entering time is 0.5 [s/L] when the flow rate of the raw water is 2 [L/s].

Then, the data indicating the calculated water-entering time is transmitted to the electrolytic current determiner 11 (Step S4).

Then, the electrolytic current determiner 11 reads data stored in the storage device 13 and indicating a target value of an amount of electrical charge per unit quantity of the generated hydrogen-containing electrolyzed water (Step S5).

Then, the electrolytic current determiner 11 determines an electrolytic current for the electrolysis to be performed in the electrolysis tank D so that the amount of the electrical charge per unit quantity of the generated hydrogen-containing electrolyzed water reaches the target value (becomes constant) (Step S6). To be more specific, the electric current determiner 11 determines the electrolytic current in accordance with Equation (1), using the transmitted data indicating the water-entering time and the transmitted data indicating the target value of the amount of the electrical charge per unit quantity of the generated hydrogen-containing electrolyzed water.

In the case of, for example, agricultural electrolyzed water, in order to avoid undesired side effects due to a rise in the pH, such as the formation of a white precipitate, in a culture solution using the electrolyzed hydrogen water, the amount of the electrical charge per unit quantity of the generated electrolyzed hydrogen water beneficially ranges from 8 C/L to 300 C/L. Hence, the target value of the amount of the electrical charge for the agricultural electrolyzed water is set at 300 C/L. In the case where the water-entering time is 0.5 [s/L], the electrolytic current is determined at 300/0.5=600 [C/s]=600 [A].

Then, the electrolytic current determiner 11 transmits a signal, on the determined electrolytic current, to the electrolytic current supplier 12 supplying the electrolysis tank D with the electrolytic current (Step S7).

Then, the electrolytic current supplier 12 supplies the electrolysis tank D with the electrolytic current based on the transmitted signal. The electrolysis tank D electrolyzes raw water so that the electrical charge per unit quantity of the generated electrolyzed hydrogen water reaches the target value. Hence, electrolyzed hydrogen water is generated (Step S8).

As can be seen, this embodiment involves controlling the electrolytic current in association with a flow rate of the incoming raw water in the electrolysis, using the electrolyzed water-generating apparatus 1. This procedure may facilitate generation of electrolyzed hydrogen water having desired; namely constant, electrical charge per unit quantity of the generated water.

Moreover, as illustrated in FIG. 1, the electrolyzed water-generating apparatus 1 of this embodiment includes: a controller 16 connected to the an electrolytic current determiner 11; and a display 17 connected to the controller 16, and displaying the amount of the electrical charge to be provided to the raw water in the electrolysis. The controller 16 controls how the amount of the electrical charge is shown on the display 17.

To be more specific, in the Step S5, the electrolytic current determiner 11 reads the data stored in the storage device 13 and indicating the target value of the amount of the electrical charge per unit quantity of the generated hydrogen-containing electrolyzed water. This data is transmitted from the electrolytic current determiner 11 to the controller 16.

Then, based on the transmitted data, the controller 16 causes the display 17 to show the above target value of the amount of the electrical charge per unit quantity of the generated hydrogen-containing electrolyzed water.

The electrolyzed water-generating apparatus cited in PATENT DOCUMENT 1 has the following problem: even though the electrolyzed water-generating apparatus could determine a pH of generated electrolyzed water, the apparatus cannot determine an amount of electrical charge provided to the raw water in electrolysis. That is why the electrolyzed water-generating apparatus cannot determine whether the generated electrolyzed water is desired one (e.g., agricultural electrolyzed water generated from raw water provided with a predetermined amount of electrical charge).

On the other hand, in this embodiment, the display 17 shows, as described above, the target value of the amount of the electrical charge, per unit quantity of the generated hydrogen-containing electrolyzed water, stored in the storage device 13, which allows for determining the amount of electrical charge provided to raw water in electrolysis. Such a feature makes it possible to easily determine from outside whether generated electrolyzed water is provided with desired amount of electrical charge.

Note that the embodiment may be modified as described below.

In the embodiment, the water-entering time is calculated based on the flow rate of the raw water to be supplied to the first electrode chamber Da; however, the water-entering time may be calculated based on a ratio of an amount of the raw water entering the first electrode chamber Da to an amount of the raw water entering the second electrode chamber Db.

For example, in the case where (i) the flow rate of all the raw water to be supplied to the first electrode chamber Da and the second electrode chamber Db is 2 [L/s], and (ii) the ratio of the amount of the raw water entering the first electrode chamber Da to the amount of the raw water entering the second electrode chamber Db is 4 to 1, the flow rate of the raw water to be supplied to the first electrode chamber Da generating the electrolyzed hydrogen water is 2×0.8=1.6 [L/s]. Thus, the water-entering time calculator 15 calculates a water-entering time of 0.625 [s/L].

Note that, in this case, the information on the ratio of entering water may be stored, for example, in the storage device 13. In the Step S3, the water-entering time calculator 15 may read the data stored in the storage device 13 and indicating the ratio of the entering water, and calculate the water-entering time [s/L] based on the transmitted data indicating the flow rate of the raw water and the transmitted data indicating the ratio of the entering water.

Moreover, in the embodiment, the first water inlet path 4a and the second water inlet path 4b have the sensor 14 in common; however, the first water inlet path 4a and the second water inlet path 4b may each have an individual sensor.

Furthermore, in the embodiment, the electrolyzed hydrogen water is generated by galvanostatic electrolysis through the control of the electrolytic current; however, the electrolyzed hydrogen water may as well be generated by controlled potential electrolysis through the control of an electrolytic voltage in association with a flow rate of the incoming raw water as long as it is possible to generate the electrolyzed hydrogen water having a desired amount of electrical charge per unit quantity of the generated water.

INDUSTRIAL APPLICABILITY

The present invention is useful for an electrolyzed water-generating apparatus which electrolyzes water to generate electrolyzed water. The present invention is also useful for generating the electrolyzed water.

DESCRIPTION OF REFERENCE CHARACTERS

| | |
|---|---|
| 1 | Electrolyzed Water-Generating Apparatus |
| 4a | First Water Inlet Path |
| 4b | Second Water Inlet Path |
| 6a | Cathode |
| 6b | Anode |
| 7a | First Water Outlet Path |
| 7b | Second Water Outlet Path |
| 10 | Electrical Charge Amount Adjuster |
| 11 | Electrolytic Current Determiner |
| 12 | Electrolytic Current Supplier |
| 13 | Storage Device |
| 14 | Sensor |
| 15 | Water-Entering Time Calculator |
| 16 | Controller |
| 17 | Display |

| | |
|---|---|
| D | Electrolysis Tank |
| Da | First Electrode Chamber (Cathode Chamber) |
| Db | Second Electrode Chamber (Anode Chamber) |
| Sp | Separating Membrane |

The invention claimed is:

1. An electrolyzed water-generating apparatus comprising:
- an electrolysis tank containing a first electrode chamber having a cathode, a second electrode chamber having an anode, and a separating membrane separating the first electrode chamber and the second electrode chamber from each other, wherein electrolysis occurs within the electrolysis tank;
- a first water inlet path connected to the first electrode chamber to supply the first electrode chamber with raw water from outside;
- a second water inlet path connected to the second electrode chamber to supply the second electrode chamber with the raw water from outside;
- a first water outlet path connected to the first electrode chamber, and dispensing out of the first electrode chamber electrolyzed hydrogen water generated by the electrolysis in the first electrode chamber;
- a second water outlet path connected to the second electrode chamber, and dispensing out of the second electrode chamber electrolyzed acidic water generated by the electrolysis in the second electrode chamber; and
- a charge amount adjuster connected to the electrolysis tank to adjust, in the electrolysis, an amount of electrical charge to be provided to the electrolyzed hydrogen water, the charge amount adjuster adjusting, based on a flow rate of the raw water, the amount of the electrical charge per unit quantity of the generated electrolyzed hydrogen water through control of an electrolytic current or an electrolytic voltage, so that the adjusted amount of the electrical charge is constant, wherein the electrical charge amount adjuster includes;
- a sensor provided to the first water inlet path and the second water inlet path, and measuring the flow rate of the raw water to be supplied to the first electrode chamber and the second electrode chamber;
- a water-entering time calculator connected to the sensor, and calculating a time period required for one liter of the raw water to enter the first electrode chamber;
- an electrolytic current determiner connected to the water-entering time calculator for determining an electrolytic current utilized during the electrolysis;
- an electrolytic current supplier connected to the electrolytic current determiner and the electrolysis tank, and supplying the electrolysis tank with the electrolytic current; and
- a storage device connected to the electrolytic current determiner, and storing data indicating a target value of the amount of the electrical charge per unit quantity of the generated hydrogen-containing electrolyzed water, wherein the water-entering time calculator calculates the time period required for one liter of the raw water to enter the first electrode chamber, based on data indicating the flow rate of the raw water, the electrolytic current determiner determines the electrolytic current based on (i) the time period calculated by the water-entering time calculator and required for one liter of the raw water to enter the first electrode chamber, and (ii) the target value of the amount of the electrical charge per unit quantity stored in the storage device, and the electrolytic current supplier supplies the electrolysis tank with the electrolytic current determined by the electrolytic current determiner.

2. The electrolyzed water generating apparatus of claim 1, wherein the amount of the electrical charge per unit quantity of the generated electrolyzed hydrogen water ranges from 8 C/L to 300 C/L.

* * * * *